United States Patent
Anshu

(10) Patent No.: US 9,270,099 B1
(45) Date of Patent: Feb. 23, 2016

(54) SLIDABLY ADJUSTABLE ELECTRICAL BOX

(71) Applicant: Tilahun Anshu, Lowell, MA (US)

(72) Inventor: Tilahun Anshu, Lowell, MA (US)

( * ) Notice: Subject to any disclaimer, the term of this patent is extended or adjusted under 35 U.S.C. 154(b) by 8 days.

(21) Appl. No.: 14/331,311

(22) Filed: Jul. 15, 2014

(51) Int. Cl.
*H01H 9/02* (2006.01)
*H02G 3/10* (2006.01)

(52) U.S. Cl.
CPC ...................... *H02G 3/10* (2013.01)

(58) Field of Classification Search
CPC ......... H02G 3/10; H02G 3/126; H02G 3/123; H02G 3/08; H05K 7/14
USPC ........... 174/50, 58, 55, 57, 481, 64, 535, 542, 174/545, 54, 61, 495, 503, 63; 220/3.7, 3.9, 220/3.2, 3.3, 4.02, 3.5; 248/200.1, 201, 248/906, 205, 200, 220.41, 220.42, 200.43, 248/221.11, 225.11, 225.21, 300, 220.21
See application file for complete search history.

(56) References Cited

U.S. PATENT DOCUMENTS

| | | | | |
|---|---|---|---|---|
| 2,039,550 A * | 5/1936 | Norton | ................... | H03G 3/123 220/3.6 |
| 2,044,650 A * | 6/1936 | Thompson | ............. | H02G 3/123 220/3.6 |
| 2,684,220 A * | 7/1954 | Beber | ..................... | F21V 21/04 174/57 |
| 2,917,199 A * | 12/1959 | Appleton | ............... | H02G 3/121 220/3.7 |
| 4,180,226 A * | 12/1979 | Matte | ..................... | H02G 3/123 223/3.9 |
| 6,929,140 B2 * | 8/2005 | Rose | ........................ | H02G 3/08 220/3.3 |
| 7,285,722 B2 * | 10/2007 | Shyr | ..................... | F16B 5/0291 174/481 |
| 7,462,775 B1 | 12/2008 | Gretz | | |
| 7,855,338 B2 * | 12/2010 | Troder | ................... | H02G 3/081 174/135 |
| 8,013,243 B2 | 9/2011 | Korcz | | |
| 8,042,776 B2 | 10/2011 | Johnson | | |
| 8,253,017 B1 | 8/2012 | Cleghorn | | |
| D692,836 S | 11/2013 | Thomas | | |
| 8,575,484 B1 | 11/2013 | Witherbee | | |
| 2010/0252552 A1 | 10/2010 | Nikayin | | |
| 2010/0288554 A1 | 11/2010 | Jafari | | |

FOREIGN PATENT DOCUMENTS

GB 2453201 4/2009

* cited by examiner

*Primary Examiner* — Angel R Estrada
*Assistant Examiner* — Dimary Lopez Cruz

(57) ABSTRACT

The electrical box assembly includes a mount operationally coupled to a stanchion. A housing is operationally coupled to the mount. The housing is positionable at a selected position with respect to the stanchion. Moreover, upon installation, the electrical box assembly is able to adjust the elevation of the electrical box assembly in order to aid in trimming over the electrical box assembly.

3 Claims, 4 Drawing Sheets

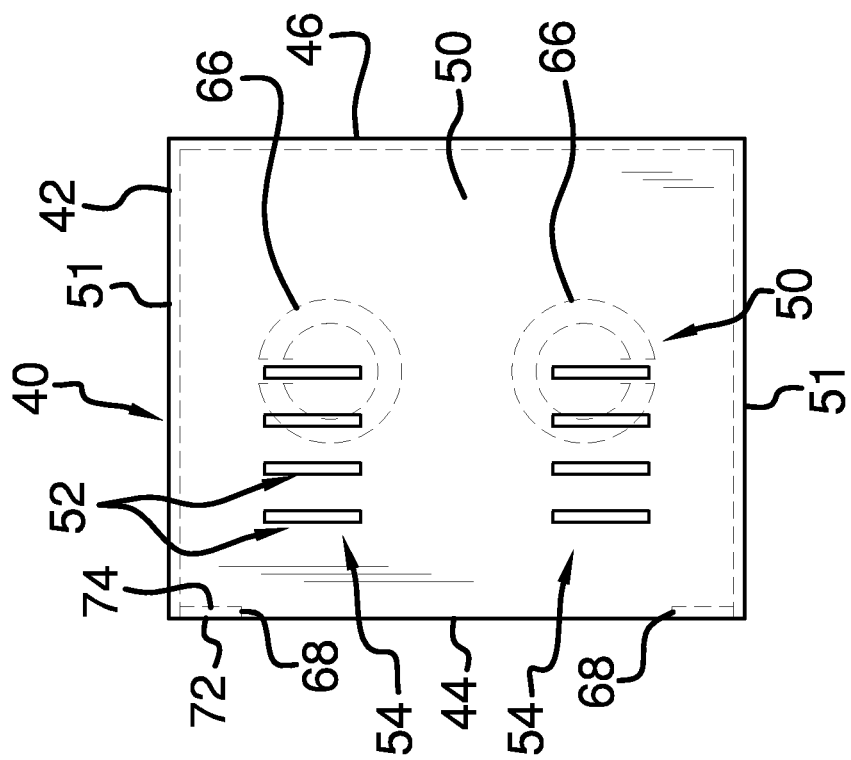
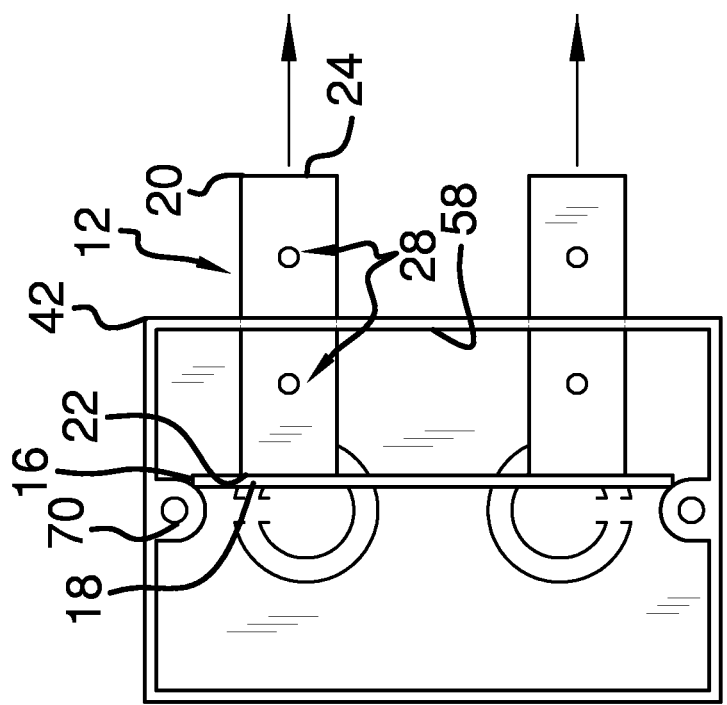

SLIDABLY ADJUSTABLE ELECTRICAL BOX

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electrical boxes, more specifically, slidably adjustable electrical boxes.

SUMMARY OF THE INVENTION

An embodiment of the disclosure meets the needs presented above by generally comprising a mount operationally coupled to a stanchion. A housing is operationally coupled to the mount. The housing is positionable at a selected position with respect to the stanchion.

An object of the invention is to provide a device that is slidably adjustable electrical box.

These together with additional objects, features and advantages of the slidably adjustable electrical box will be readily apparent to those of ordinary skill in the art upon reading the following detailed description of presently slidably adjustable electrical box when taken in conjunction with the accompanying drawings.

In this respect, before explaining the current embodiments of the slidably adjustable electrical box in detail, it is to be understood that the slidably adjustable electrical box is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the slidably adjustable electrical box.

It is therefore important that the claims be regarded as including such equivalent construction insofar as they do not depart from the spirit and scope of the slidably adjustable electrical box. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a front view of an embodiment of the disclosure.

FIG. 3 is a left side view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
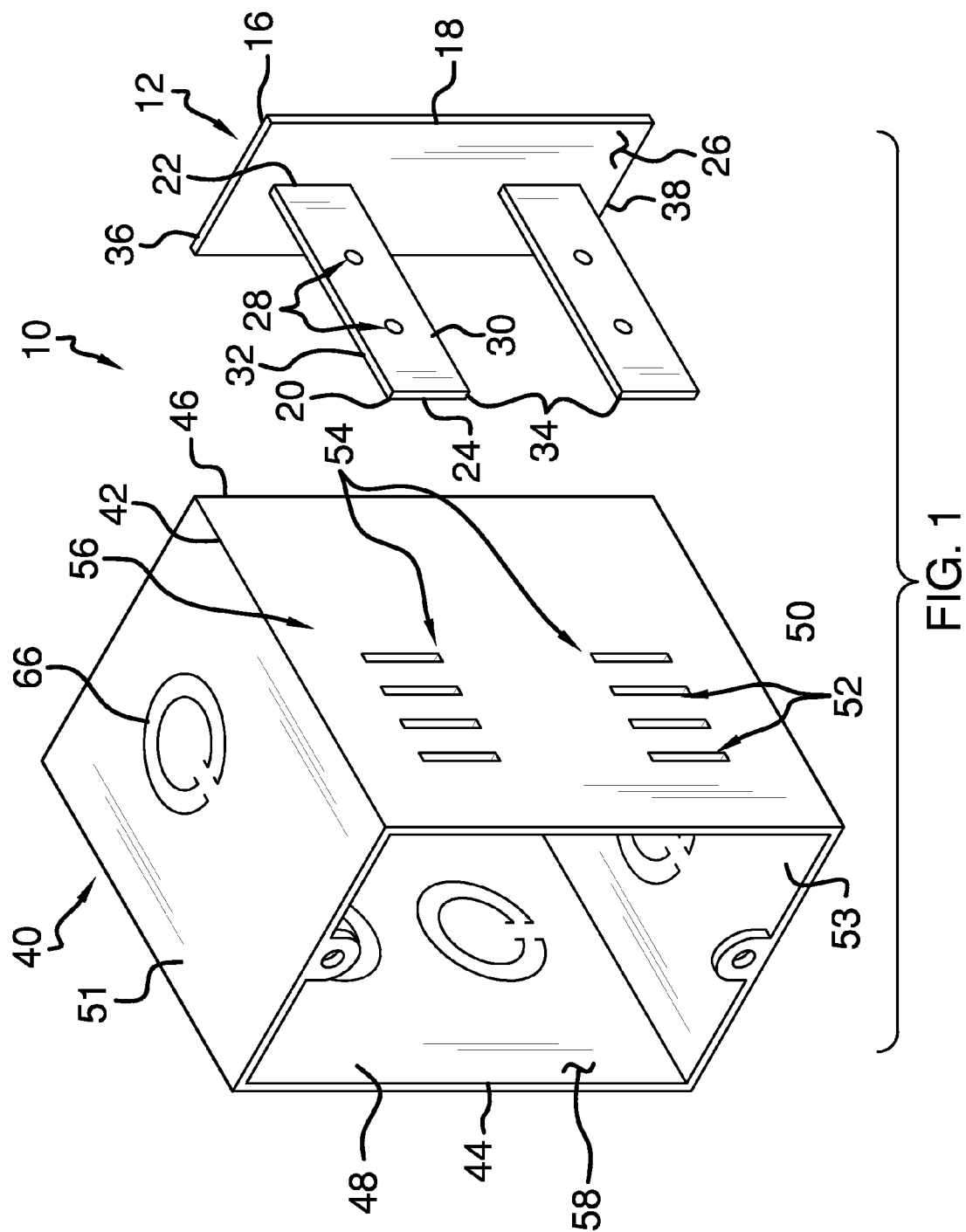
FIG. 1 is a perspective view of a electrical box assembly according to an embodiment of the disclosure.
Figure 4:
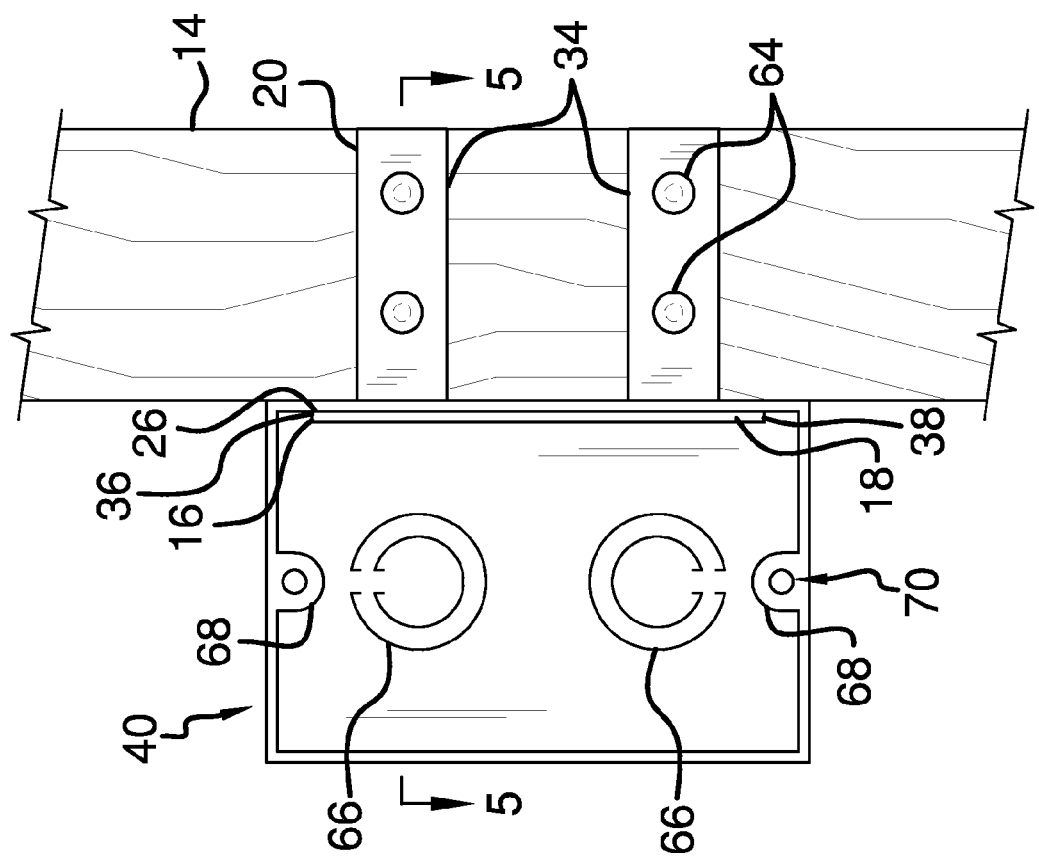
FIG. 4 is an in-use view of an embodiment of the disclosure.
Figure 5:
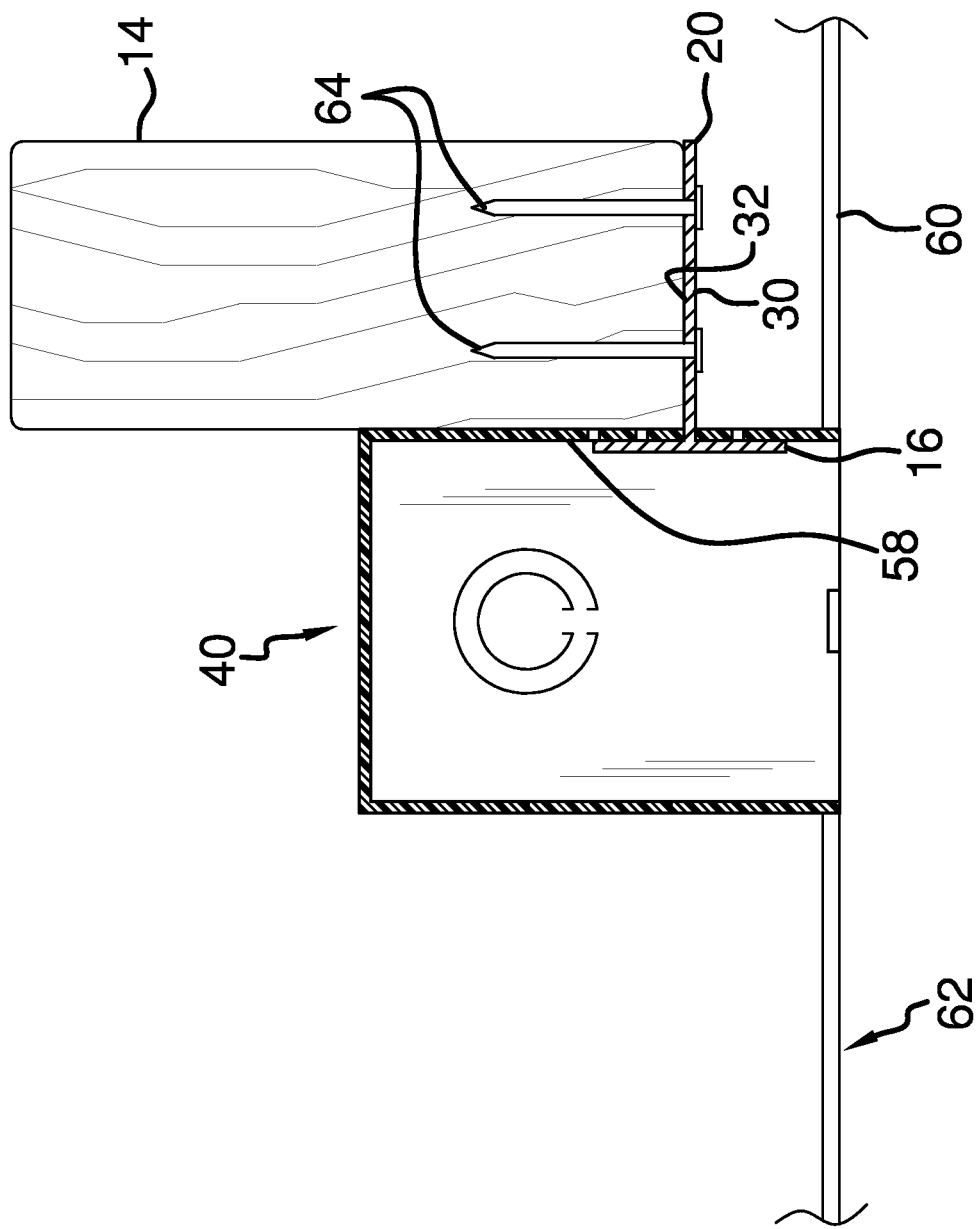
FIG. 5 is a cross sectional view taken along line 5-5 of FIG. 4 of an embodiment of the disclosure.

As best illustrated in FIGS. 1 through 5, the electrical box assembly 10 generally comprises a mount 12 operationally coupled to a stanchion 14. The stanchion 14 may be a framing member in a wall. The mount 12 comprises a plate 16. An outer edge 18 of the plate 16 has a width that is less than a height of the plate 16. The plate 16 has a rectangular shape.

The mount 12 further comprises a stick 20. The stick 20 has a first end 22 and a second end 24. Additionally, the stick 20 is elongated between the first 22 and second 24 ends. The first end 22 of the stick 20 is coupled to a front surface 26 of the plate 16 so the stick 20 extends laterally away from the plate 16.

The stick 20 has a pair of fastener apertures 28 extending through a front side 30 and a back side 32 of the stick 20. The pair of fastener apertures 28 is evenly spaced apart and distributed between the first 22 and second 24 ends of the stick 20. Moreover, the stick 20 is one of a pair of the sticks 34. Each of the pair of sticks 34 is positioned proximate an associated one of a top side 36 and a bottom side 38 of the outer edge 18 of the plate 16.

A housing 40 is provided. An exterior wall 42 of the housing 40 has a front side 44, a back side 46, a first lateral side 48, a second lateral side 50, a top side 51 and a bottom side 53. The front side 44 of the exterior wall 42 of the housing 40 is open to access an interior of the housing 40.

Each of the first 48 and second 50 lateral sides of the exterior wall 42 of the housing 40 has either a plurality of slots 52 extending there through or at least one knockout 66 thereon. The first 48 later side is depicted with at least one of the knockouts 66 thereon; whereas the second 50 lateral side is depicted with the plurality of slots 52.

The plurality of slots 52 is arranged in a pair of rows of the plurality of slots 54 on the second 50 lateral side of the exterior wall 42 of the housing 40. Each of the pair of rows of the plurality of slots 54 extends between the front side 44 of the exterior wall 42 of the housing 40 and a center 56 of the exterior wall 42 of the housing 40. The pair of rows of the plurality of slots 54 each is positioned proximate an associated one of the top 52 and bottom 54 sides of the exterior wall 42 of the housing 40.

The mount 12 is slidably coupled to the housing 40. The pair of sticks 34 each extends outwardly through a selected one of an associated one of the pair of rows of the plurality of slots 54. The front surface 26 of the plate 16 abuts an inside surface 58 of the exterior wall 42 of the housing 40.

The pair of sticks 34 each is extended through the selected one of each of the pair of rows of the plurality of slots 54 so the front side 44 of the exterior wall 42 of the housing 40 is positioned a selected distance from the stanchion 14. The pair of sticks 34 are positioned so the front side 44 of the exterior wall 42 of the housing 40 is positioned proximate an exposed surface 60 of a support surface 62. The support surface 62 may be a wall.

A plurality of fasteners 64 is each extended through each of the pair of fastener apertures 28 in each of the pair of sticks 34. The plurality of fasteners 64 engages the stanchion 14 so the housing 40 is retained on the stanchion 14. The plurality of fasteners 64 may be nails of any conventional design.

The plurality of knockouts 66 are distributed on each of the top side 51, the bottom side 53, the first 48 lateral side, and the back side 46 of the exterior wall 42 of the housing 40. The plurality of knockouts 66 are selectively removable to access the interior of the housing 40.

A pair of tabs 68 is each coupled to an associated one of the top 52 and bottom 54 sides of the exterior wall 42 of the housing 40. Each of the pair of tabs 68 is positioned adjacent to the front side 44 of the exterior wall 42 of the housing 40. Additionally, each of the pair of tabs 68 has a fastener aperture 70 extending through a front side 72 and a back side 74 of each of the pair of tabs 68. Moreover, the pair of tabs 68 are directed inwardly with respect to the front side 44 of the housing 40.

In use, the mount 12 is positioned in the selected plurality of slots 52 so the front side 44 of the exterior wall 42 of the housing 40 is flush with the exposed surface 60 of the support surface 62. The assembly 10 is utilized in the convention of residential or commercial electrical wiring. Additionally, the assembly 10 allows for the front side 44 of the exterior wall 42 of the housing 40 to be properly trimmed with a wall plate in the convention of residential or commercial construction practices. The assembly 10 eliminates the need to modify an existing wall if a traditional electrical box cannot be properly trimmed with the wall plate due to improper clearance between the stanchion 14 and the exposed surface 60 of the wall 62.

With respect to the above description, it is to be realized that the optimum dimensional relationship for the various components of the electrical box assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the electrical box assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An electrical box assembly having an adjustable mounting depth, said assembly comprising: a mount adapted to be coupled to a stanchion; a housing operationally coupled to said mount such that said housing is adapted to a selected position with respect to said stanchion; wherein an exterior wall of said housing having a front side, a back side, a first lateral side, a second lateral side, a top side and a bottom side; wherein said mount comprising a plate, an outer edge of said plate having a width being less than a height of said plate such that said plate has a rectangular shape; wherein said mount further comprising a pair of sticks; said pair of sticks each having a first end and a second end, said pair of sticks being elongated between said first and second ends; wherein said first end of said pair of sticks being coupled to a front surface of said plate such that each of said pair of sticks extends laterally away from said plate; each of said pair of sticks being positioned proximate an associated one of a top edge and a bottom edge of the plate; wherein the front side of an exterior wall of said housing being open to access an interior of said housing; wherein the second lateral side of an exterior wall of said housing includes a plurality of slots extending therethrough; wherein said plurality of slots being arranged in a pair of rows of said plurality of slots on said second lateral side of said exterior wall of said housing; wherein each of said pair of rows of said plurality of slots extending between the front side of said exterior wall of said housing and a center of said exterior wall of said housing; and said pair of rows of said plurality of slots each being positioned proximate an associated one of the top side and the bottom side of said exterior wall of said housing; wherein said pair of sticks being extended through the selected one of each of said pair of rows of slots such that a front side of said exterior wall of said housing is adapted to be positioned a selected distance from the stanchion.

2. The assembly according to claim 1, wherein a pair of fastener apertures being evenly spaced apart and distributed between said first end and said second end of said pair of sticks; wherein a fastener being extended through each of the pair of fastener apertures in each of said pair of sticks and adapted to engage the stanchion such that said housing is adapted to be retained on the stanchion.

3. The assembly according to claim 1, wherein a plurality of knockouts are distributed on each of the top side, the bottom side, the first lateral side, and the back side of the exterior wall of the housing; wherein the plurality of knockouts are selectively removable to access the interior of the housing; wherein a pair of tabs is each coupled to an associated one of the top and bottom sides of the exterior wall of the housing; wherein each of the pair of tabs is positioned adjacent to the front side of the exterior wall of the housing; wherein additionally, each of the pair of tabs has a fastener aperture extending through a front side and a back side of each of the pair of tabs; wherein the pair of tabs are directed inwardly with respect to the front side of the housing.

\* \* \* \* \*